United States Patent
Johri et al.

(10) Patent No.: US 10,486,687 B2
(45) Date of Patent: Nov. 26, 2019

(54) HYBRID VEHICLE AND EMISSION REDUCTION STRATEGY

(71) Applicant: FORD GLOBAL TECHNOLOGIES, LLC, Dearborn, MI (US)

(72) Inventors: Rajit Johri, Canton, MI (US); Fazal Urrahman Syed, Canton, MI (US); Justin Panhans, Detroit, MI (US); Sassan Farahmand, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 15/674,786

(22) Filed: Aug. 11, 2017

(65) Prior Publication Data

US 2019/0047547 A1    Feb. 14, 2019

(51) Int. Cl.
| | | |
|---|---|---|
| *B60W 20/16* | (2016.01) | |
| *B60W 10/06* | (2006.01) | |
| *B60W 10/08* | (2006.01) | |

(52) U.S. Cl.
CPC ............ B60W 20/16 (2016.01); B60W 10/06 (2013.01); B60W 10/08 (2013.01); *B60W 2540/10* (2013.01); *B60W 2560/00* (2013.01); *B60W 2710/0666* (2013.01); *B60W 2710/083* (2013.01); *Y10S 903/93* (2013.01)

(58) Field of Classification Search
CPC ...... B60W 10/08; B60W 10/06; B60W 20/15; B60W 20/00; B60W 20/16; B60W 2710/0666; B60W 2710/083
See application file for complete search history.

(56) References Cited

U.S. PATENT DOCUMENTS

| | | | |
|---|---|---|---|
| 6,327,852 B1 | 12/2001 | Hirose | |
| 6,657,315 B1 * | 12/2003 | Peters | ............ B60K 6/485 290/40 C |
| 6,856,034 B2 | 2/2005 | Peters et al. | |
| 9,428,175 B2 | 8/2016 | Dextreit | |
| 2006/0156710 A1 * | 7/2006 | Pott | ............ B60K 6/48 60/285 |
| 2009/0199560 A1 * | 8/2009 | Maier | ............ B60K 6/485 60/700 |
| 2010/0036582 A1 * | 2/2010 | Kwiatkowski | ...... F02D 41/0002 701/103 |
| 2013/0158756 A1 * | 6/2013 | Yamazaki | ............ B60W 20/19 701/22 |
| 2014/0013726 A1 * | 1/2014 | Yacoub | ............ F01N 3/32 60/274 |

(Continued)

FOREIGN PATENT DOCUMENTS

DE        102005039316 A1    2/2007

*Primary Examiner* — Redhwan K Mawari
(74) *Attorney, Agent, or Firm* — David Kelley; Brooks Kushman P.C.

(57) ABSTRACT

A vehicle includes a powertrain and a controller. The powertrain has an engine and an electric machine. The controller is programmed to, for so long as a catalytic converter temperature is less than a threshold, maintain a steady state engine torque output and adjust an electric machine torque output to satisfy driver demand. The controller is further programmed to, responsive to the catalytic converter temperature exceeding the threshold, permit adjustments of the engine torque output to satisfy the driver demand.

15 Claims, 2 Drawing Sheets

(56) References Cited

U.S. PATENT DOCUMENTS

| | | | |
|---|---|---|---|
| 2015/0267649 A1* | 9/2015 | Remes | F01N 3/20 60/605.2 |
| 2015/0275711 A1* | 10/2015 | Whitney | F01L 1/34409 701/105 |
| 2016/0137182 A1* | 5/2016 | Johri | B60W 20/10 701/22 |
| 2016/0244043 A1* | 8/2016 | Nefcy | B60W 10/26 |
| 2017/0021824 A1* | 1/2017 | Johri | B60W 20/19 |
| 2017/0267229 A1* | 9/2017 | Hashimoto | B60K 6/485 |
| 2017/0291595 A1* | 10/2017 | Kim | B60W 10/02 |
| 2017/0362982 A1* | 12/2017 | Miao | F01N 3/2026 |
| 2019/0047547 A1* | 2/2019 | Johri | B60W 20/16 |

\* cited by examiner

1

HYBRID VEHICLE AND EMISSION REDUCTION STRATEGY

TECHNICAL FIELD

The present disclosure relates to control systems for hybrid vehicles.

BACKGROUND

Convention strategies for reducing emissions in a vehicle powered by an internal combustion engine after a cold start include adjusting the spark timing within the engine, the air/fuel ratio, and/or idle speed patterns in order to minimize hydrocarbon feed gas while also minimizing catalyst light-off time of the catalytic converter.

SUMMARY

A vehicle includes a powertrain and a controller. The powertrain has an engine and an electric machine. The controller is programmed to, for so long as a catalytic converter temperature is less than a threshold, maintain a steady state engine torque output and adjust an electric machine torque output to satisfy driver demand. The controller is further programmed to, responsive to the catalytic converter temperature exceeding the threshold, permit adjustments of the engine torque output to satisfy the driver demand.

A vehicle includes an engine, an electric machine, an engine exhaust system, and a controller. The engine and the electric machine are each configured generate torque to propel the vehicle. The engine exhaust system has a catalytic converter configured to operate above a threshold temperature. The controller is programmed to, for so long as a temperature of the catalytic converter is less than the threshold temperature, maintain a steady state engine torque output and adjust an electric machine torque output to satisfy a driver demanded torque. The controller is further programmed to, responsive to a desired electric machine torque output being outside an operating range of the electric machine to satisfy driver demand during the maintaining, adjust the electric machine torque output to a limit of the operating range and override the maintaining to adjust the engine torque output to satisfy the driver demand.

A method for controlling a vehicle powertrain includes, for so long as a catalytic converter temperature is less than a threshold, maintaining a predetermined steady state engine torque and adjusting an electric machine torque to satisfy powertrain demanded torque. The method further includes, responsive to the catalytic converter temperature exceeding the threshold, adjusting the engine and electric machine torques to satisfy powertrain demanded torque.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
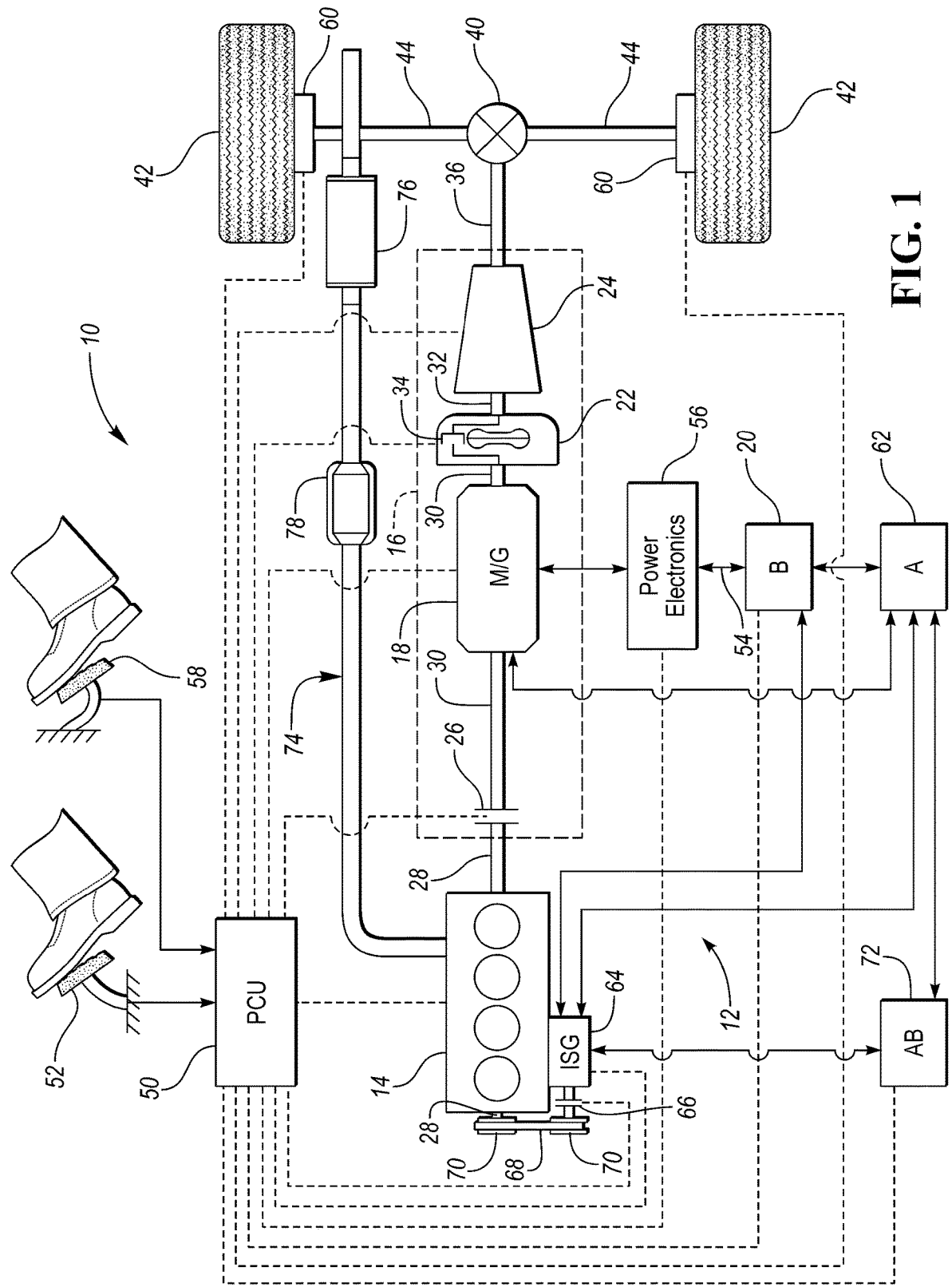
FIG. 1 is a schematic illustration of a representative powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

An exhaust system 74 is configured to channel the exhaust produced by the engine 14 away from the vehicle 10. The exhaust system 74 may include a muffler 76 to reduce the noise emitted by the exhaust system 74 and a catalytic converter 78. The catalytic converter 78 may be a three-way catalytic converter that is configured to reduce the amount carbon monoxide (CO), unburned hydrocarbons (HC), and oxides of Nitrogen ($NO_x$) that are released into the atmosphere. The catalyst within the catalytic converter 78 may only be operable above a light-off temperature, which is the temperature at which catalytic reactions within the catalytic converter are initiated.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 2:
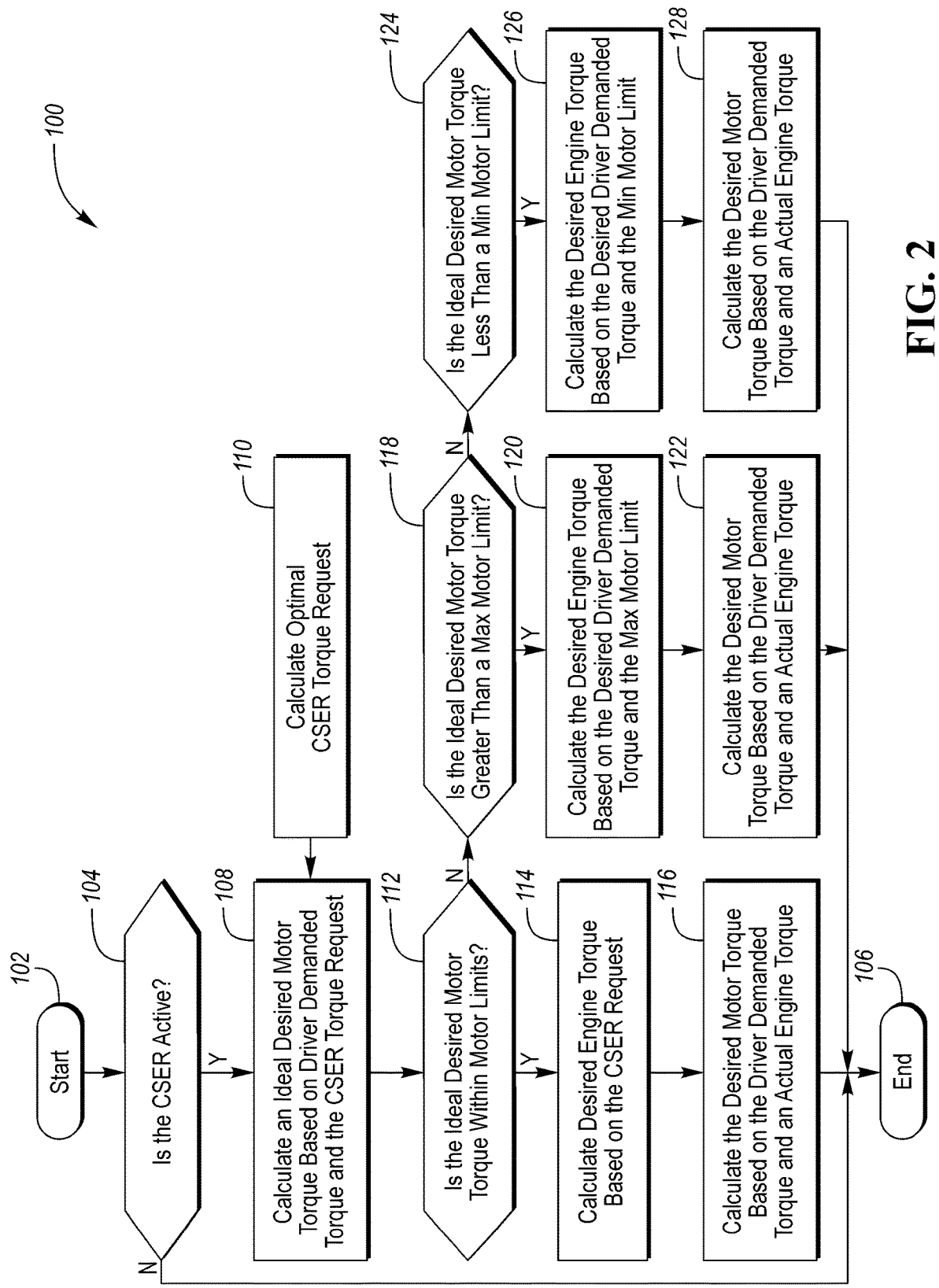
FIG. 2 is a flowchart illustrating a method for controlling a vehicle powertrain after a cold start according to an emission reduction strategy.

Referring to FIG. 2, a flowchart of a method 100 for controlling the vehicle powertrain 12 after a cold start according to an emission reduction strategy is illustrated. The method 100 may be executed by the controller 50 in response to various conditions of the vehicle 10 and/or various conditions of specific vehicle subcomponents. The method 100 splits the torque output of the engine 14 and the torque output of the M/G 18 for a given driver demanded torque to optimally reduce tailpipe emissions while also minimizing impact on fuel economy. The method 100 is initiated at start block 102. The method 100 may be initiated once the vehicle operator has turned on the vehicle ignition. Once the method 100 has been initiated at start block 102, the method 100 moves on to step 104 where it is determined if a coordinated strategy for emission reduction (CSER) is active. The CSER may be activated after a cold start. More specifically, the CSER may be activated if the catalytic converter temperature is less than a threshold temperature. The threshold temperature may correspond to the light-off temperature of the catalytic converter 78 or may correspond to a calibrated predetermined temperature value that is below or above the light-off temperature. Furthermore, the CSER may remain active for as long as the temperature of the catalytic converter 78 is less than the threshold temperature. If the CSER is not active, the method 100 ends at block 106. After the method 100 has ended at block 106, the engine 14 and the M/G 18 may be controlled according to a conventional method such that the total driver demand for torque is optimally split between the engine 14 and the M/G 18 to maximize fuel economy.

If the CSER is active, the method 100 moves on to block 108 where an ideal desired (or requested) torque output of the M/G 18 is calculated. The ideal desired torque output of the M/G 18 is based on the driver demanded torque (i.e., the desired total torque output of the engine 14 and M/G 18) and the optimal desired torque output of the engine 14 (or CSER torque), which is input into block 108 from block 110. The optimal desired torque output of the engine 14 is a specified steady state torque that is calculated to provide minimal light-off time of the catalytic converter 78 while also keeping noise, vibration, and harshness (NVH) of the engine 14 low (i.e., below a threshold). The ideal desired torque output of the M/G 18 may be represented by equation (1):

$$\tau_{mtr}^{ideal,req} = \tau_{DD} - \tau_{CSER} \quad (1)$$

where $\tau_{mtr}^{ideal,req}$ is the ideal desired torque output of the M/G 18, $\tau_{DD}$ is the driver (or powertrain) mtr demanded torque, and $t_{CSER}$ is the optimal desired torque output of the engine 14.

Once the ideal desired torque output of the M/G $\tau_{mtr}^{ideal,req}$ calculated, the method 100 moves on to block 112, where it is determined if the ideal desired torque output of the M/G $\tau_{mtr}^{ideal,req}$ is within an operating range of the M/G 18 (i.e., within the torque limitations of the M/G 18 based on the mechanical limits of the M/G 18 and the limits of the battery 20 to deliver or receive electrical power to or from the M/G 18). The torque limitations of the M/G 18 may include a maximum torque output limit $\tau_{mtr}^{max}$ and a minimum torque output limit $\tau_{mtr}^{min}$. If the ideal desired torque output of the M/G $\tau_{mtr}^{ideal,req}$ is within an operating range of the M/G 18 (e.g., $\tau_{mtr}^{max} > \tau_{mtr}^{ideal,req} > \tau_{mtr}^{min}$), the method 100 moves on to blocks 114 and 116. At block 114, a desired engine torque output $\tau_{eng}^{req}$ is calculated based on the optimal desired torque output of the engine $\tau_{CSER}$. At block 116, a desired motor torque output $\tau_{mtr}^{req}$ is calculated based on the driver demanded torque $\tau_{DD}$ and an actual or measured engine torque Tens. The desired engine torque output $\tau_{eng}^{req}$ may be represented by equation (2) and the desired motor torque output $\tau_{mtr}^{req}$, may be represented by equation (3):

$$\tau_{eng}^{req} = \tau_{CSER} \quad (2)$$

$$\tau_{mtr}^{req} = \tau_{DD} - \tau_{eng} \quad (3)$$

The method 100 will continue to maintain the steady state torque of the engine (i.e., the optimal desired torque output of the engine $\tau_{CSER}$) and adjust the desired motor torque output $\tau_{mtr}^{req}$ to satisfy driver demanded torque $\tau_{DD}$ at blocks 114 and 116 and according to equations (2) and (3) for as long as the temperature of the catalytic converter 78 remains less the threshold temperature or for as long as the ideal desired torque output of the M/G $\tau_{mtr}^{ideal,req}$ remains within an operating range of the M/G 18. Once the temperature of the catalytic converter 78 surpasses the threshold temperature, the method 100 ends at block 106 where the engine 14 torque may be adjusted to satisfy the driver demanded torque $\tau_{DD}$ (i.e., the engine is no longer required to be maintained at the steady state torque).

On the other hand, if the ideal desired torque output of the M/G $\tau_{mtr}^{ideal,req}$ falls outside of the operating range of the M/G 18 required to satisfy driver demanded torque $\tau_{DD}$ while the temperature of the catalytic converter 78 remains less the threshold temperature, the method 100 moves on to block 118. The method 100 may transition to block 118 immediately if the desired torque output of the M/G $\tau_{mtr}^{ideal,req}$ is initially outside the operating range of the M/G 18 or may transition to block 118 after controlling the torque of the engine 14 and the torque of the M/G 18 based on blocks 114 and 116 if the desired torque output of the M/G $\tau_{mtr}^{ideal,req}$ transitions from a value within to outside of the operating range of the M/G 18. Once the desired torque output of the M/G $\tau_{mtr}^{ideal,req}$ falls outside of the operating range of the M/G 18 required to satisfy driver demanded torque $\tau_{DD}$ while the temperature of the catalytic converter 78 remains less the threshold temperature, the torque of the M/G 18 may be adjusted to a limit (maximum or minimum) of the operating range of the M/G 18 while maintaining the steady state torque of the engine (i.e., the optimal desired torque output of the engine $\tau_{CSER}$) is overridden such that the torque output of the engine 14 will be adjusted to a value other than the steady state torque in order to satisfy the driver demanded torque $\tau_{DD}$ At block 118 it is determined if the ideal desired torque output of the M/G $\tau_{mtr}^{ideal,req}$ is greater than the maximum torque output limit $\tau_{mtr}^{max}$ of the M/G 18. If the ideal desired torque output of the M/G $\tau_{mtr}^{ideal,req}$ is greater than the maximum torque output limit $\tau_{mtr}^{ideal,req}$ of the M/G 18, the method 100 moves on to blocks 120 and 122. It should be noted that under such a condition, the driver demanded torque $\tau_{DD}$ will be greater than a sum of the steady state torque of the engine (i.e., the optimal desired torque output of the engine $\tau_{CSER}$) and maximum torque output limit $\tau_{mtr}^{max}$ of the M/G 18. Therefore, in order to satisfy driver demanded torque $\tau_{DD}$, the desired engine torque output $\tau_{eng}^{req}$ will need to be increased to a value that is greater than the steady state torque of the engine (i.e., the optimal desired torque output of the engine $\tau_{CSER}$). At block 120, the desired engine torque q output $\tau_{eng}^{req}$ is calculated based on the driver demanded torque $\tau_{DD}$ and the maximum torque output limit $\tau_{mtr}^{max}$ of the M/G 18. At block 122, the desired motor torque output $\tau_{mtr}^{req}$ is again calculated based on the driver demanded torque $\tau_{DD}$ and the actual or measured engine torque $\tau_{eng}^{act}$. The desired engine torque output $\tau_{eng}^{req}$ may be represented by equation (4) and the desired motor torque output $\tau_{mtr}^{req}$ may again be represented by equation (3):

$$\tau_{eng}^{req} = \tau_{DD} - \tau_{mtr}^{max} \tag{4}$$

$$\tau_{mtr}^{req} = \tau_{DD} - \tau_{eng} \tag{3}$$

At blocks 120 and 122, the torque output of the M/G 18 will ideally be increased to the maximum torque output limit $\tau_{mtr}^{max}$ of the M/G 18 while maintaining the steady state torque of the engine (i.e., the optimal desired torque output of the engine $\tau_{CSER}$) will be overridden such that the torque output of the engine 14 will be increased to a value above the steady state torque in order to satisfy the driver demanded torque $\tau_{DD}$. The method 100 will continue to control the torque output of the M/G 18 and the torque output of the engine 14 according to blocks 120 and 122 for as long as the temperature of the catalytic converter 78 remains less the threshold temperature or for as long as the ideal desired torque output of the M/G $\tau_{mtr}^{ideal,req}$ remains greater than the maximum torque output limit $\tau_{mtr}^{max}$ of the M/G 18. Once the temperature of the catalytic converter 78 surpasses the threshold temperature, the method 100 ends at block 106, as described above.

On the other hand, if the ideal desired torque output of the M/G $\tau_{mtr}^{ideal,req}$ returns to a value that is within the operating range of the M/G 18 (e.g., $\tau_{mtr}^{max} > \tau_{mtr}^{ideal,req} > \tau_{mtr}^{min}$), the method 100 may return controlling the torque of the engine 14 and the torque of the M/G 18 based on blocks 114 and 116, or if the if the ideal desired torque output of the M/G $\tau_{mtr}^{ideal,req}$ decreases to a value that is less than the minimum torque output limit $\tau_{mtr}^{min}$ of the M/G 18 the method 100 may control the torque of the engine 14 and the torque of the M/G 18 based on blocks 126 and 128, described below. Returning to block 118, if the ideal desired torque output of the M/G $\tau_{mtr}^{ideal,req}$ is not greater than the maximum torque output limit $\tau_{mtr}^{max}$ of the M/G 18, the method 100 moves on to block 124.

At block 124 it is determined if the ideal desired torque output of the M/G $\tau_{mtr}^{ideal,req}$ is less than the minimum torque output limit $\tau_{mtr}^{min}$ of the M/G 18. If the ideal desired torque output of the M/G $\tau_{mtr}^{ideal,req}$ is less than the minimum torque output limit $\tau_{mtr}^{min}$ of the M/G 18, the method 100 moves on to blocks 126 and 128. It should be noted that under such a condition, the driver demanded torque $\tau_{DD}$ may be less than the steady state torque of the engine (i.e., the optimal desired torque output of the engine $\tau_{CSER}$) or may be greater than the steady state torque of the but less than a sum of the steady state torque of the engine and the minimum torque output limit $\tau_{mtr}^{min}$ of the M/G 18, depending on whether the minimum torque output limit $\tau_{mtr}^{min}$ of the M/G 18 has a negative, positive, or zero value. Therefore, in order to satisfy driver demanded torque $\tau_{DD}$, the desired engine torque output $\tau_{eng}^{req}$ will need to be decreased to a value that is less than the steady state torque of the engine (i.e., the optimal desired torque output of the engine $\tau_{CSER}$). At block 126, the desired engine torque output $\tau_{eng}^{req}$ is calculated based on the driver demanded torque $\tau_{DD}$ and the minimum torque output limit $\tau_{mtr}^{min}$ of the M/G 18. At block 128, the desired motor torque output $\tau_{mtr}^{req}$ is again calculated based on the driver demanded torque $\tau_{DD}$ and the actual or measured engine torque $\tau_{eng}^{act}$. The desired engine torque output $\tau_{eng}^{req}$ may be represented by equation (5) and the desired motor torque output $\tau_{mtr}^{req}$ may again be represented by equation (3):

$$\tau_{eng}^{req} = \tau_{DD} - \tau_{mtr}^{min} \tag{5}$$

$$\tau_{mtr}^{req} = \tau_{DD} - \tau_{eng} \tag{3}$$

At blocks 126 and 128, the torque output of the M/G 18 will ideally be adjusted to the minimum torque output limit $\tau_{mtr}^{min}$ of the M/G 18 while maintaining the steady state torque of the engine (i.e., the optimal desired torque output of the engine $\tau_{CSER}$) will be overridden such that the torque output of the engine 14 will be decreased to a value below the steady state torque in order to satisfy the driver demanded torque $\tau_{DD}$. The method 100 will continue to control the torque output of the M/G 18 and the torque output of the engine 14 according to blocks 126 and 128 for as long as the temperature of the catalytic converter 78 remains less the threshold temperature or for as long as the ideal desired torque output of the M/G $\tau_{mtr}^{ideal,req}$ remains less than the minimum torque output limit $\tau_{mtr}^{min}$ of the M/G 18. Once the temperature of the catalytic converter 78 surpasses the threshold temperature, the method 100 ends at block 106, as described above.

On the other hand, if the ideal desired torque output of the M/G $\tau_{mtr}^{ideal,req}$ returns to a value that is within the operating range of the M/G 18 (e.g., $\tau_{mtr}^{max} > \tau_{mtr}^{ideal,req} > \tau_{mtr}^{min}$), the method 100 may return controlling the torque of the engine 14 and the torque of the M/G 18 based on blocks 114 and 116. Alternatively, if the if the ideal desired torque output of the M/G $\tau_{mtr}^{ideal,req}$ increases to a value that is greater than the maximum torque output limit $\tau_{mtr}^{max}$ of the M/G 18 the method 100 may return controlling the torque of the engine 14 and the torque of the M/G 18 based on blocks 120 and 122.

It should be understood that the flowchart in FIG. 2 is for illustrative purposes only and that the method 100 should not be construed as limited to the flowchart in FIG. 2. Some of the steps of the method 100 may be rearranged while others may be omitted entirely.

In the scenarios described above, where the ideal desired torque output of the M/G $\tau_{mtr}^{ideal,req}$ is greater than the maximum torque output limit $\tau_{mtr}^{max}$ of the M/G 18 by a calibratable value or the ideal desired torque output of the M/G $\tau_{mtr}^{ideal,req}$ is less than the minimum torque output limit $\tau_{mtr}^{min}$ of the M/G 18 by a calibratable value, the desired engine torque output $\tau_{eng}^{req}$ may be ramped slowly to meet the driver demanded torque $\tau_{DD}$. Under a scenario where the desired engine torque output $\tau_{eng}^{req}$ is ramped slowly to meet the driver demanded torque $\tau_{DD}$, the desired engine torque output $\tau_{eng}^{req}$ may be represented by equation (6) and the desired motor torque output $\tau_{mtr}^{req}$ may again be represented by equation (3):

$$\tau_{eng}^{req} = \tau_{DD} - \tau_{EM} \quad (6)$$

$$\tau_{mtr}^{req} = \tau_{DD} - \tau_{eng} \quad (3)$$

where $\tau_{EM}$ is the energy management torque. It should be noted that the energy management torque may be set to zero while the CSER is active.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a powertrain having an engine and an electric machine;
   a catalytic converter; and
   a controller programmed to,
   responsive to a catalytic converter temperature being less than a threshold and a driver demanded torque being within an operating range of the electric machine plus a predetermined steady state engine torque output that minimizes a light-off time of the catalytic converter, maintain the engine torque at the predetermined steady state engine torque output and adjust an electric machine torque output to satisfy the driver demanded torque,
   responsive to the catalytic converter temperature being less than the threshold and the driver demanded torque being outside the operating range of the electric machine plus the predetermined steady state engine torque output that minimizes the light-off time of the catalytic converter, adjust electric machine torque output to a limit of the operating range of the electric machine, override the maintaining, and adjust the engine torque output to satisfy the driver demanded torque, and
   responsive to the catalytic converter temperature exceeding the threshold, permit adjustments of the engine torque output to satisfy the driver demanded torque.

2. The vehicle of claim 1, wherein the controller is further programmed to, responsive to the driver demanded torque being greater than a sum of the steady state engine torque output and a maximum electric machine torque output during the maintaining, override the maintaining to increase the engine torque output to satisfy the driver demanded torque.

3. The vehicle of claim 1, wherein the controller is further programmed to, responsive to the driver demanded torque being less than the steady state engine torque output during the maintaining, adjust the electric machine torque output to a minimum electric machine torque output and override the maintaining to decrease the engine torque output to satisfy the driver demanded torque.

4. The vehicle of claim 1, wherein the threshold is a catalytic converter light-off temperature.

5. The vehicle of claim 1, wherein the threshold is a predetermined temperature value above a catalytic converter light-off temperature.

6. A vehicle comprising:
   an engine and an electric machine each configured generate torque to propel the vehicle;
   an engine exhaust system having a catalytic converter configured to operate above a threshold temperature; and
   a controller programmed to,
   responsive to a temperature the catalytic converter being less than the threshold temperature and a driver demanded torque being within an operating range of the electric machine plus a predetermined steady state engine torque output that minimizes a light-off time of the catalytic converter, maintain the engine torque at the predetermined steady state engine torque output and adjust an electric machine torque output to satisfy the driver demanded torque,
   responsive to the temperature of the catalytic converter temperature being less than the threshold temperature and the driver demanded torque being outside the operating range of the electric machine plus the predetermined steady state engine torque output that minimizes the light-off time of the catalytic converter, adjust electric machine torque output to a limit of the operating range of the electric machine, override the maintaining, and adjust the engine torque output to satisfy the driver demanded torque, and
   responsive to the temperature of the catalytic converter exceeding the threshold, permit adjustments of the engine torque output to satisfy the driver demanded torque.

7. The vehicle of claim 6, wherein the controller is further programmed to, responsive to the driver demanded torque being greater than a sum of the steady state engine torque output and a maximum electric machine torque output during the maintaining, override the maintaining to increase the engine torque output to satisfy the driver demanded torque.

8. The vehicle of claim 6, wherein the controller is further programmed to, responsive to the driver demanded torque being less than the steady state engine torque output during the maintaining, adjust the electric machine torque output to a minimum electric machine torque output and override the maintaining to decrease the engine torque output to satisfy the driver demanded torque.

9. The vehicle of claim 6, wherein the threshold is a catalytic converter light-off temperature.

10. The vehicle of claim 6, wherein the threshold is a predetermined temperature value above a catalytic converter light-off temperature.

11. A method for controlling a vehicle powertrain comprising:
    responsive to a catalytic converter temperature being less than a threshold and a powertrain demanded torque being within an operating range of an electric machine plus a predetermined steady state engine torque output that minimizes a light-off time of the catalytic converter, maintaining the predetermined steady state engine torque output and adjusting an electric machine torque to satisfy the powertrain demanded torque;

responsive to the catalytic converter temperature being less than the threshold and the powertrain demanded torque being outside the operating range of the electric machine plus the predetermined steady state engine torque output that minimizes the light-off time of the catalytic converter, adjusting electric machine torque output to a limit of the operating range of the electric machine, overriding the maintaining, and adjusting the engine torque output to satisfy the driver demanded torque; and responsive to the catalytic converter temperature exceeding the threshold, adjusting engine and electric machine torques to satisfy powertrain demanded torque.

12. The method of claim 11 further comprising:
responsive to the powertrain demanded torque being greater than a sum of the steady state engine torque and a maximum electric machine torque during the maintaining, override the maintaining to increase the engine torque to satisfy the powertrain demanded torque.

13. The method of claim 11 further comprising:
responsive to the powertrain demanded torque being less than the steady state engine torque the maintaining, adjust the electric machine torque to the minimum electric machine torque output and override the maintaining to decrease the engine torque to satisfy the powertrain demanded torque.

14. The method of claim 11, wherein the threshold is a catalytic converter light-off temperature.

15. The method of claim 11, wherein the threshold is a predetermined temperature value above a catalytic converter light-off temperature.

* * * * *